United States Patent
Kwak et al.

(10) Patent No.: US 7,468,226 B2
(45) Date of Patent: Dec. 23, 2008

(54) POROUS FILM TYPE SOLVENT-FREE POLYMER ELECTROLYTE FILLED WITH OLIGOMER/PREPOLYMER ELECTROLYTE AND SECONDARY BATTERY EMPLOYING THE SAME

(75) Inventors: Seung-Yeop Kwak, Seoul (KR); Jae-Deok Jeon, Seoul (KR)

(73) Assignee: Seoul National University Industry Foundation, Seoul (KR)

( * ) Notice: Subject to any disclaimer, the term of this patent is extended or adjusted under 35 U.S.C. 154(b) by 50 days.

(21) Appl. No.: 10/590,728

(22) PCT Filed: Feb. 26, 2005

(86) PCT No.: PCT/KR2005/000525

§ 371 (c)(1),
(2), (4) Date: Nov. 29, 2006

(87) PCT Pub. No.: WO2005/081646

PCT Pub. Date: Sep. 9, 2005

(65) Prior Publication Data

US 2008/0038642 A1    Feb. 14, 2008

(30) Foreign Application Priority Data

Feb. 26, 2004    (KR) .................... 10-2004-0012983

(51) Int. Cl.
*H01M 10/40*    (2006.01)
(52) U.S. Cl. .................. 429/309; 429/316; 429/317
(58) Field of Classification Search ................. 429/309, 429/316, 317
See application file for complete search history.

(56) References Cited

U.S. PATENT DOCUMENTS

| 4,952,466 A | 8/1990 | Cipriano |
| 5,001,023 A * | 3/1991 | Cheshire et al. ......... 429/317 X |
| 5,424,150 A | 6/1995 | Ohnishi |
| 6,949,318 B2 * | 9/2005 | Choi et al. ............. 429/309 X |
| 2005/0196678 A1 * | 9/2005 | Yamamoto et al. .......... 429/317 |

FOREIGN PATENT DOCUMENTS

| JP | 02-038451 | 2/1990 |
| JP | 2001-217010 | 8/2001 |

* cited by examiner

*Primary Examiner*—Stephen J. Kalafut
(74) *Attorney, Agent, or Firm*—Jones, Tullar & Cooper, P.C.

(57) ABSTRACT

A solvent-free polymer electrolyte and a secondary battery employing the electrolyte are provided. The electrolyte includes: a porous film, including a first polymer and a second oligomer, the first polymer being at least one selected from the group consisting of poly (vinylidene fluoride-co-hexafluoropropylene) copolymers, polyvinylidenefluorides, polymethylmethacrylates, polyacrylonitriles, polyethyleneoxides, and celluloses having a polyether chain, and the second oligomer being at least one selected from the group consisting of poly(ethylene oxide-co-ethylene carbonate) copolymers with at least one terminal groups substituted by a halogen atom and polyethyleneglycols with at least one terminal group substituted by a halogen atom. An electrolyte comprising the second oligomer and a lithium salt is present in the pores of the porous film.

13 Claims, 5 Drawing Sheets

POROUS FILM TYPE SOLVENT-FREE POLYMER ELECTROLYTE FILLED WITH OLIGOMER/PREPOLYMER ELECTROLYTE AND SECONDARY BATTERY EMPLOYING THE SAME

TECHNICAL FIELD

The present invention relates to a porous film type solvent-free polymer electrolyte and a secondary battery employing the same. More particularly, the present invention relates to a solvent-free polymer electrolyte which is improved in safety, electrochemical performance, and ionic conductivity, as compared to a conventional solvent-free polymer electrolyte, and a secondary battery employing the same.

BACKGROUND ART

The demands for high-performance batteries have grown significantly in various fields including mobile communications, portable electronic devices, electric automobiles, and capacitors. Lithium polymer secondary batteries, which have begun to be commercialized in recent years, include a cathode, an anode, and an electrolyte for preventing short-circuit of the two electrodes and providing ion transfer medium. The polymer electrolytes for lithium polymer secondary batteries are classified into two groups according to the type of an electrolyte: gel-type polymer electrolyte using a mixture of an organic solvent and a polymer material and solvent-free polymer electrolyte using only a polymer material.

A solvent-free polymer electrolyte has advantages of high electrochemical stability and compatibility with a high-capacity lithium metal electrode. However, due to very low ionic conductivity at room temperature, the solvent-free polymer electrolyte is still commercially unavailable. On the other hand, a gel-type polymer electrolyte contains large amounts of an electrolyte solution, and thus, has very high ionic conductivity and electrochemical characteristics comparable to a conventional liquid electrolyte. Therefore, the gel-type polymer electrolyte has been commercialized. A Bellcore process developed by Bell Communications & Research Co., which is a representative preparation process for a gel-type polymer electrolyte, is as follows.

First, polyacrylonitrile, polyethyleneoxide, or poly(vinylidene fluoride-co-hexafluoropropylene) copolymer as a matrix polymer, dibutylphthalate as a plasticizer, silicon dioxide as a filler, and an organic solvent are mixed and stirred to obtain a casting composition and the casting composition is cast to obtain a polymer film. The plasticizer is extracted from the polymer film in a subsequent process to form micro-channels in the polymer film. Then, an electrode assembly obtained by interposing the polymer film between a cathode and an anode is inserted in a can- or pouch-type case and sealed. The resultant structure is impregnated with an electrolyte solution obtained by adding a lithium salt to a mixed organic solvent in which linear carbonates and cyclic carbonates are mixed at an appropriate ratio, so that the electrolyte solution is filled in the micro-channels of the polymer film, to thereby complete battery fabrication. An electrode assembly may also be manufactured in such a way that a polymer film with micro-channels is impregnated with an electrolyte solution and then interposed between a cathode and an anode.

A lithium polymer battery employing such a gel-type polymer electrolyte contains a smaller amount of an electrolyte solution compared to a lithium ion battery employing as an electrolyte solution only a mixed organic solvent containing an appropriate ratio of linear carbonates and cyclic carbonates. However, the absolute amount of the electrolyte solution contained in the lithium polymer battery employing the gel-type polymer electrolyte is still high. Therefore, the lithium polymer battery employing the gel-type polymer electrolyte has problems such as degradation of electrochemical characteristics due to leakage or evaporation of the electrolyte solution and difficulties in safety assurance and fabrication process. In detail, the lithium polymer battery employing the gel-type polymer electrolyte may be ignited by decomposition or gasification of the electrolyte solution when heated or may undergo degradation of electrochemical properties by leakage or evaporation of the electrolyte solution.

DISCLOSURE OF INVENTION

1. Technical Problem

In this regard, there are higher demands to develop a solvent-free polymer electrolyte containing substantially no electrolyte solution but exhibiting high ionic conductivity and electrochemical stability and a secondary battery employing the solvent-free polymer electrolyte.

2. Technical Solution

In view of the problems caused by an electrolyte solution contained in a conventional gel-type polymer electrolyte, the present invention provides a solvent-free polymer electrolyte with improvements of safety, electrochemical performance, and ionic conductivity, as compared to a conventional solvent-free polymer electrolyte.

The present invention also provides a secondary battery employing the solvent-free polymer electrolyte.

According to an aspect of the present invention, there is provided a solvent-free polymer electrolyte including:

a porous film having a first surface and a second surface, the porous film includes a reticulated network of channels formed between pores on the first and second surfaces, and is made of a mixture including a first polymer and a second oligomer (or pre-polymer), the first polymer being at least one selected from the group consisting of copolymers of vinylidenefluoride and hexafluoropropylene (hereinafter, referred to as "P(VdF-HFP)"), polyvinylidenefluorides, polymethylmethacrylates, polyacrylonitriles, polyethyleneoxides, and celluloses having a polyether chain, the second oligomer being at least one selected from the group consisting of poly(ethylene oxide-co-ethylene carbonate) (hereinafter, referred to as "P(EO-EC)") copolymers with at least one terminal groups substituted by a halogen atom and polyethyleneglycols with at least one terminal groups substituted by a halogen atom, and each of the first polymer and the second oligomer being present in the mixture in an amount capable of forming a single phase; and an electrolyte present in the pores of the porous film and including the second oligomer and a lithium salt.

According to another aspect of the present invention, there is provided a secondary battery including: an anode including a carbonaceous material; a cathode including a compound enabling intercalation and deintercalation of lithium; and a solvent-free polymer electrolyte interposed between the cathode and the anode, wherein the solvent-free polymer electrolyte is the solvent-free polymer electrolyte according to the present invention.

ADVANTAGEOUS EFFECTS

As apparent from the below description, since a solvent-free polymer electrolyte according to the present invention is prepared by impregnation of a porous film with a viscous oligomer under vacuum, use of an electrolyte solution is not required. Therefore, the solvent-free polymer electrolyte is not accompanied by problems caused by leakage or evaporation of an electrolyte solution. Further, since the viscous oligomer is contained in pores, higher ionic conductivity is accomplished, as compared to a conventional solvent-free polymer electrolyte. In addition, the solvent-free polymer electrolyte according to the present invention does not exhibit rapid reduction in ionic conductivity even at low temperature, and thus, provides high electrochemical stability.

BEST MODE

Figure 1A:
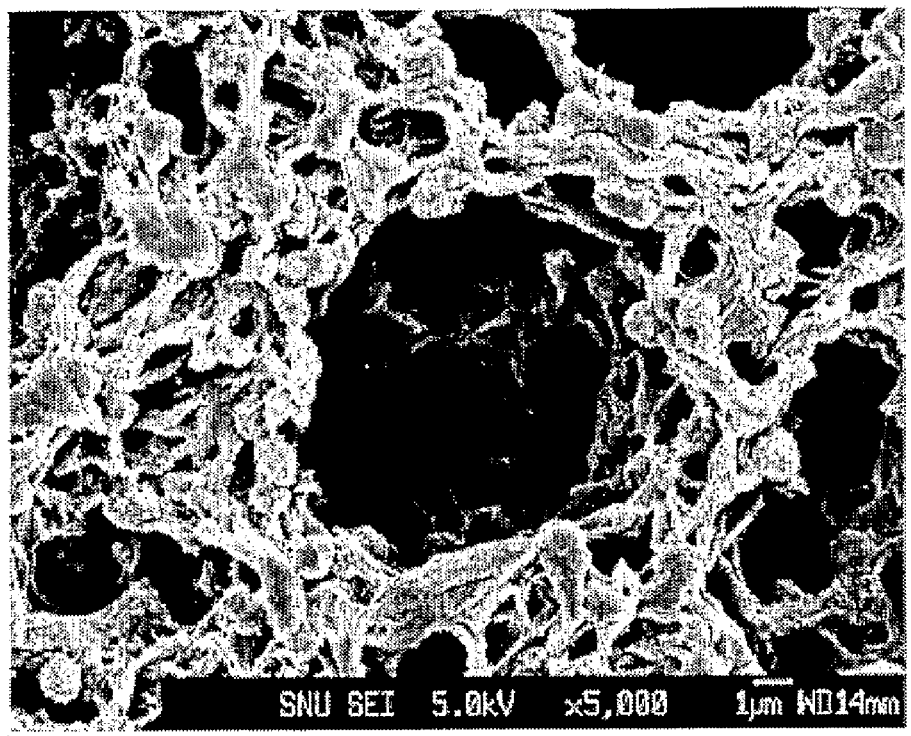
FIG. 1A is a scanning electron microscope (SEM) image of a porous film obtained in Example 2 according to the present invention.

Hereinafter, a solvent-free polymer electrolyte according to the present invention and a secondary battery employing the same will be described in more detail.

The present invention provides a solvent-free polymer electrolyte including:

a porous film having a first surface and a second surface, the porous film includes a reticulated network of channels formed between pores on the first and second surfaces, and is made of a mixture including a first polymer and a second oligomer, the first polymer being at least one selected from the group consisting of P(VdF-HFP) copolymers, polyvinylidenefluorides, polymethylmethacrylates, polyacrylonitriles, polyethyleneoxides, and celluloses having a polyether chain, the second oligomer being at least one selected from the group consisting of P(EO-EC) copolymers with at least one terminal groups substituted by a halogen atom and polyethyleneglycols with at least one terminal groups substituted by a halogen atom, and each of the first polymer and the second oligomer being present in the mixture in an amount capable of forming a single phase; and an electrolyte present in the pores of the porous film and including the second oligomer and a lithium salt.

In the mixture for formation of the porous film, each of the first polymer and the second oligomer is present in an amount capable of forming a single phase. In detail, the weight ratio of the first polymer to the second oligomer is in the range of 95:5 to 35:65, preferably 90:10 to 40:60, and more preferably 80:20 to 50:50. The first polymer serves to impart good mechanical strength to the porous film. If the weight ratio of the first polymer exceeds 95, film flexibility may decrease, which makes it difficult to impregnate the electrolyte into the porous film. The second oligomer serves to increase the flexibility and pore size of the porous film. If the weight ratio of the second oligomer exceeds 65, formation of a self-supporting film may be difficult.

The porous film may further include an inorganic filler to enhance ionic conductivity, electrochemical stability, and mechanical property. Examples of the inorganic filler that can be used for these purposes include, but are not limited to, titanium dioxide ($TiO_2$), silicon dioxide ($SiO_2$), alumina ($Al_2O_3$), lithium aluminate (gamma-$LiAlO_2$), and zeolite.

As described above, a viscous oligomer electrolyte is present in the pores of the porous film. The viscous oligomer electrolyte includes the second oligomer which is at least one selected from the group consisting of P(EO-EC) copolymers with at least one terminal groups substituted by a halogen atom and polyethyleneglycols with at least one terminal groups substituted by a halogen atom, and a lithium salt. The lithium salt is generally used in an amount of 0.1 to 10 mmol, preferably 0.5 to 5 mmol, and more preferably 1 to 3 mmol, based on 1 g of the second oligomer. If the content of the lithium salt is less than 0.1 mmol, the number of charge carriers may decrease, thereby lowering ionic conductivity. On the other hand, if it exceeds 10 mmol, ion aggregation may occur, and thus, the number of effective charge carriers may decrease, thereby lowering ionic conductivity.

Examples of the lithium salt that can be used herein include $LiPF_6$, $LiBF_4$, $LiClO_4$ $LiCF_3SO_3$, $LiC_4F_9SO_3$, $LiN(CF_3SO_2)_2$, $LiAsF_6$, and $LiN(SO_2C_2F_5)_2$. The lithium salt is not particularly limited provided that it enables the dissociation of lithium ions that can be intercalated and deintercalated between an anode and a cathode of a battery.

The oligomer electrolyte may further include an inorganic filler to enhance ionic conductivity, electrochemical stability, etc. Examples of the inorganic filler that can be used for the purposes include, but are not limited to, titanium dioxide ($TiO_2$), silicon dioxide ($SiO_2$), alumina ($Al_2O_3$), lithium aluminate (gamma-$LiAlO_2$), and zeolite.

In the solvent-free polymer electrolyte according to the present invention, the content of the oligomer electrolyte impregnated in the porous film is in the range from 5 to 40 g, preferably from 10 to 30 g, based on 10 g of the porous film. However, the content of the oligomer electrolyte can be appropriately adjusted considering the electrochemical performance of a secondary battery to be manufactured and the content ratio of the second oligomer to the lithium salt in the polymer electrolyte.

As described above, a solvent-free polymer electrolyte according to the present invention includes a porous film used as a matrix and a viscous electrolyte impregnated in pores of the porous film. The viscous polymer electrolyte includes the second oligomer which is at least one selected from the group consisting of P(EO-EC) copolymers with at least one terminal groups substituted by a halogen atom and polyethyleneglycols with at least one terminal groups substituted by a halogen atom.

The polyethyleneglycols with at least one terminal groups substituted by a halogen atom may be represented by the following formula 1:

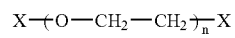

<Formula 1> wherein n is an integer of 6 to 110, preferably 6 to 50, and X is a halogen atom.

The P(EO-EC) copolymers with at least one terminal groups substituted by a halogen atom may be represented by the following formula 2:

<Formula 2>

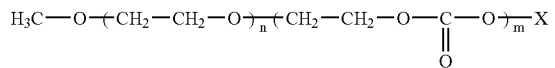

Preferably, the number average molecular weight of the oligomer represented by the formula 1 or 2 is in the range from 300 to 5,000, and more preferably from 500 to 3,000. If the number average molecular weight of the oligomer represented by the formula 1 or 2 is too small, leakage or evaporation of the oligomer may occur. On the other hand, if it is too large, the impregnation of the viscous electrolyte into the porous film may be difficult, and molecular mobility may be lowered, which renders realization of high ionic conductivity difficult.

As represented in the formulae 1 and 2, it is preferable that a hydroxyl terminal group of the second oligomer is substituted by a halogen atom or other inert group such as alkyl groups or alkoxy groups since the hydroxyl terminal group can easily react with metallic lithium.

In the P(EO-EC) copolymers that can be used as the second oligomer, the molar ratio of EO unit to EC unit is in the range of 9:1 to 1:9, preferably 8:2 to 2:8, and more preferably 7:3 to 3:7. If the molar ratio of EO unit to EC unit is less than 9:1 or exceeds 1:9, i.e., if the ratio of EO unit or EC unit is too small, crystallization of the P(EO-EC) copolymers may occur, and thus, ion transfer may be prevented, thereby reducing ionic conductivity.

A method for preparing a solvent-free polymer electrolyte according to the present invention will now be described.

(1) Synthesis of Second Oligomer

First, synthesis of polyethyleneglycol with at least one terminal groups substituted by chlorine atom as represented by the formula 1 used as a second oligomer serving to increase the ionic conductivity of a solvent-free polymer electrolyte according to the present invention will be described.

Small amount of thionylchloride ($SOCl_2$) is added to polyethyleneglycol under a nitrogen atmosphere and refluxed at 50 to 100° C. for 2 to 4 days to substitute a hydroxyl end group of polyethyleneglycol by chlorine atom. Then, the resultant product is placed in a vacuum oven and dried at 80 to 120° C. for 2 to 4 days to sufficiently remove a residual volatile material.

Synthesis of P(EO-EC) copolymer with at least one terminal groups substituted by chlorine atom as represented by the formula 2 used as a second oligomer will now be described.

First, small amount of potassium methoxide ($CH_3OK$) or potassium hydroxide (KOH) used as an initiator is added to an ethylene carbonate (EC) monomer under a nitrogen atmosphere and stirred at 150 to 200° C. for 5 to 30 hours. As the reaction proceeds, EO groups are formed simultaneously with emission of a carbon dioxide ($CO_2$) gas from portions of EC groups. After 18 to 22 hours of the reaction, P(EO-EC) copolymer is obtained with reduction in the emission of the carbon dioxide gas. A reaction solution at an initial stage of the reaction reveals clear. However, as the reaction proceeds, the reaction solution becomes light yellow. At 6 to 12 hours after the reaction, a dark yellow reaction solution is produced, and after 12 hours of the reaction, a brown reaction solution is produced.

Then, small amount of thionylchloride is added to the P(EO-EC) copolymer with a hydroxyl terminal group and refluxed to substitute the hydroxyl terminal group by chlorine atom. Then, the resultant product is dried in a vacuum oven at 80 to 120° C. for 2 to 4 days to sufficiently remove a volatile material.

(2) Fabrication of Porous Film

At least one first polymer selected from the above-described polymers, at least one second oligomer selected from the above-described oligomers with at least one terminal groups substituted by a halogen atom, and an acetone solvent are placed in a beaker and sufficiently dissolved with heating. Then, an ethyleneglycol non-solvent is added, heated, and stirred to obtain a uniform mixed solution. In some cases, an inorganic filler such as titanium dioxide and silicon dioxide may be further added to the mixed solution to increase ionic conductivity. Preferably, the volume ratio of the acetone solvent to the ethyleneglycol non-solvent is in the range of 95:5 to 75:25. If the content of the acetone solvent is too large, the pore size or porosity of a porous film may decrease, which renders electrolyte impregnation difficult or decreases degree of impregnation. If the content of the ethyleneglycol non-solvent is too large, the dissolution of the polymer may be difficult or a pore size may excessively increase, thereby decreasing the mechanical strength of a porous film.

The mixed solution is left stand after being heated mildly to accomplish air bubble removal and thermal equilibration. Then, the resultant solution is cast onto a glass plate to obtain a polymer film. After sufficiently evaporating the solvent, the polymer film is several times cleaned with methanol. By doing so, a residual non-solvent in the polymer film is removed, and thus, numerous pores are formed at a surface of or in the polymer film and interconnected to thereby produce a porous film with a reticulated network of channels. The porous film thus produced is sufficiently dried in a vacuum oven at 40 to 60° C. for 1 to 2 days, for example.

Meanwhile, the porous film is thermally treated at 80 to 150° C. for 1 to 5 hours to increase mechanical strength that has been decreased due to the inclusion of the second oligomer. If the thermal treatment temperature is less than 80° C., a thermal treatment effect may be insufficient. On the other hand, if the thermal treatment temperature exceeds 150° C., it may approximate the melting temperature ($T_m$) of the first polymer like P(VdF-HFP), thereby decreasing porosity by pore destruction.

(3) Preparation of Solvent-Free Polymer Electrolyte

The viscous second oligomer, a lithium salt, and an inorganic filler such as titanium dioxide and silicon dioxide for enhancement of ionic conductivity and electrochemical stability are added to a solvent of the second oligomer such as acetone and uniformly dispersed. The solvent is then substantially completely removed from the reaction mixture to obtain a polymer electrolyte composition. Even though the polymer electrolyte composition contains no solvents, it has flowability like starch syrup because of the presence of the viscous second oligomer with small molecular weight.

Next, the polymer electrolyte composition is spread on an upper surface of the porous film fabricated in Section (2) by an appropriate method. At this time, heating of the polymer electrolyte composition at about 80° C. can decrease viscosity, and thus impart higher flowability to the polymer electrolyte composition. Vacuum is then applied to a lower surface of the porous film. As a result, the polymer electrolyte composition is impregnated into pores of the porous film by a pressure difference between the lower surface and the upper surface of the porous film, to thereby obtain a solvent-free polymer electrolyte.

Examples of the lithium salt include $LiPF_6$, $LiBF_4$, $LiClO_4$, $LiCF_3SO_3$, $LiC_4F_9SO_3$, $LiN(CF_3SO_2)_2$, and $LiAsF_6$.

(4) Fabrication of Secondary Battery

The solvent-free polymer electrolyte film prepared in Section (3) is interposed between an anode including a carbonaceous material such as natural or artificial graphite as an anode active material and a cathode including a compound enabling the intercalation and deintercalation of lithium as a cathode active material to obtain an electrode assembly. Then, the electrode assembly is inserted in a pouch- or can-type case and sealed to produce a secondary battery.

In fabrication of a secondary battery using the solvent-free polymer electrolyte according to the present invention, an anode active material, a cathode active material, a binder resin, an electroconductive agent, a processing aid, etc. are not particularly limited provided that the types of the above-described materials and a battery fabrication method are those conventionally used in the pertinent art.

The shape of a secondary battery according to the present invention is not particularly limited. Various known shapes, including a coin type, a button type, a square type, a cylinder type, a pouch type, etc. may be used.

MODE FOR INVENTION

Hereinafter, a solvent-free polymer electrolyte and a secondary battery according to the present invention will be described more specifically by Examples. However, the following Examples are provided only for illustrations and thus the present invention is not limited to or by them.

EXAMPLE 1

Synthesis of P(EO-EC) Copolymer with at Least One Terminal Groups Substituted by Chlorine Atom This Example shows an example of synthesis of P(EO-EC) copolymer with at least one terminal groups substituted by chlorine atom as represented by the formula 2.

176.12 g (1 mol) of EC monomer and 70.14 mg (1 mmol) of potassium methoxide as an initiator were placed in a two-neck flask installed in an oil bath equipped with a temperature controller. After the reaction mixture was completely dissolved, it was incubated at 180° C. for 15 hours under nitrogen atmosphere. EO groups were generated with emission of $CO_2$ gas from portions of EC groups to thereby produce P(EO-EC) copolymer. After the reaction terminated, to remove EC that might remain in the resultant product, the product was dissolved in 200 mL of ethanol and then added to 2 L of ether to separate an ether layer in which EC was dissolved. The resultant product was several times cleaned with ether until residual EC was completely removed and then dried in a 80° C. vacuum oven for 24 hours.

Number average molecular weight, polydispersity, degree of conversion of monomer to oligomer, molar ratio of EO unit/EC unit, and glass transition temperature ($T_g$) of the P(EO-EC) copolymer thus synthesized are summarized in Table 1 below.

Each data of Table 1 was measured as follows.

Measurement of Number Average Molecular Weight and Polydispersity

The number average molecular weight ($M_n$) and weight average molecular weight ($M_w$) of the synthesized P(EO-EC) copolymer were measured using a Model 410 GPC apparatus (Waters). A sample was dissolved in THF (tetrahydrofuran). 100□ of the obtained solution was injected to a column and analysis was performed at an elution rate of 1 ml min$^{-1}$ at 40° C. The following monodisperse polystyrenes were used as standard materials: Aldrich, product Nos.: 32,782-2 ($M_w$ 800), 32,771-9 ($M_w$ 2,500), 32,772-7 ($M_w$ 4,000), 37,951-4 ($M_w$ 13,000), 32,774-3 ($M_w$ 20,000), 32,775-1 ($M_w$ 35,000), 33,034-5 ($M_w$ 50,000), and 32,777-8 ($M_w$ 90,000).

Polydispersity was calculated by the following Equation using the obtained number average molecular weight ($M_n$) and weight average molecular weight ($M_w$).

Polydispersity=$M_w/M_n$.

Measurement of $T_g$

The $T_g$ of the P(EO-EC) copolymer was measured according to differential scanning calorimetry (DSC) using a DSC 2920 apparatus (TA Instruments). A sample weight was about 10 mg. The DSC thermogram for the P(EO-EC) copolymer was obtained under a nitrogen gas atmosphere at a temperature range of –100 to 200° C. at a heating rate of 10° C. min$^{-1}$. The second scan value was selected as the result.

Measurement of Degree of Conversion and Molar Ratio of EO Unit/EC Unit

To measure degree of conversion and the molar ratio of EO unit/EC unit, a solution obtained by dissolving the P(EO-EC) copolymer in a $CDCl_3$ solvent was subjected to hydrogen nuclear magnetic resonance spectroscopy ($^1H$ NMR) to obtain the NMR spectrum. The degree of conversion and molar ratio of EO unit/EC unit were evaluated from the ratio of peak area for hydrogen atoms in EO groups to the peak area for hydrogen atoms in EC groups obtained from the NMR spectrum.

TABLE 1

| Sample | $M_n$ (g mol$^{-1}$) | Poly-dispersity | Degree of conversion | EO/EC (molar ratio) | $T_g$ (° C.) |
|---|---|---|---|---|---|
| P(EO-EC) | 1,800 | 2.39 | 100 | 7/3 | −44 |

Meanwhile, since a hydroxyl terminal group of the P(EO-EC) copolymer easily reacts with metallic lithium, 20 g of the P(EO-EC) copolymer and 1 g of thionylchloride were placed in a two-neck flask installed in an oil bath equipped with a temperature controller and completely dissolved with stirring. Then, the reaction mixture was refluxed at 60° C. for three days under nitrogen atmosphere. After the reaction terminated, the resultant solution was dried at a 100° C. vacuum oven for about two days to completely remove residual volatile materials.

EXAMPLE 2

Fabrication of Porous Films

This Example shows an example of fabrication of porous films using a phase inversion process.

A P(VdF-HFP) copolymer (Aldrich, $M_w$: 455,000, $T_m$: 155-160° C.), the P(EO-EC) copolymer with at least one terminal groups substituted by chlorine atom synthesized in Example 1, and an acetone solvent were placed in a beaker and sufficiently dissolved with heating at 50° C. Then, an ethyleneglycol non-solvent was added to the reaction mixture, heated and stirred at 50° C. for 5 hours, to obtain a uniform mixed solution. At this time, the volume ratio of acetone to ethyleneglycol was set to 90:10 and the total polymer concentration of the mixed solution was set to 10 wt %.

The weight ratio of the P(VdF-HFP) copolymer to the P(EO-EC) copolymer varied as follows: 10:0, 9:1, 8:2, 7:3, 6:4, and 5:5.

The mixed solution was left stand at 50° C. for 2 hours to accomplish air bubble removal and thermal equilibration and then cast on a glass plate. The resultant structure was subjected to sufficient evaporation of a solvent and then repeated cleaning with methanol to remove a residual non-solvent. Porous films thus produced were dried in a 50° C. vacuum oven for about 24 hours.

FIG. 1A shows a scanning electron microscope (SEM) image of a porous film thus obtained. Referring to FIG. 1A, numerous pores were formed in the film and interconnected in a polymer matrix to form a reticulated network of channels.

The porosity and the degree of impregnation of an oligomer electrolyte of the porous films were changed according to the content of the P(EO-EC) copolymer. The porous films were thermally treated in a 110° C. oven for about 2 hours to supplement the mechanical property that had been decreased due to the addition of the P(EO-EC) copolymer. The porosity and the degree of impregnation before and after the thermal treatment are presented in Table 2 below.

Each data listed in Table 2 was measured as follows.

Porosity

The weights and densities of the porous films sufficiently dried at 50° C. in a vacuum oven for 5 hours were measured. Then, the dried films were placed in beakers containing n-butanol (manufactured by Aldrich, density: 0.811 g ml$^{-1}$) and impregnation was performed for one hour. The impregnated films were taken out from the beakers and n-butanol remained on surfaces of the films was removed using a filter paper to measure the weights of the films.

Porosity was calculated using the following Equation:

$$\text{Porosity (\%)} = (W_a/r_a)/(W_a/r_a + W_p/r_p) \times 100$$

where $W_a$ is the weight of n-butanol impregnated in the porous film, $W_p$ is the weight of the dried porous film, $r_a$ is the density of n-butanol, and $r_p$ is the density of the porous film.

Degree of Impregnation

The weights of the porous films sufficiently dried at room temperature in a vacuum oven for 5 hours were measured. Then, the dried porous films were placed on a vacuum filter holder apparatus, viscous P(EO-EC) was uniformly spread on the upper surface of the porous films, and vacuum was applied to the lower surface of the films so that the P(EO-EC) was impregnated into the porous films by a pressure difference between upper and lower surfaces of the porous films. Surfaces of the impregnated films were fully cleaned using a filter paper and then the weights of the films were measured.

The degree of impregnation was calculated using the following Equation:

$$\text{Degree of impregnation (\%)} = (W-W_0)/W \times 100$$

where W is the weight of a film impregnated with an oligomer electrolyte and $W_o$ is the weight of a dried film.

In Table 2, each porous film was represented by M-VxEy. That is, M represents a film, V represents P(VdF-HFP), E represents P(EO-EC) with at least one terminal groups substituted by chlorine atom, x and y represent the weight ratio (wt %) of P(VdF-HFP) and P(EO-EC), respectively. For example, M-V7E3 represents a porous film produced using a polymer mixture in which the weight ratio of P(VdF-HFP) to P(EO-EC) is 7 to 3.

As shown in Table 2, as the content of P(EO-EC) copolymer with at least one terminal groups substituted by chlorine atom increased, the porosity and degree of impregnation of the porous films increased. The porosity and degree of impregnation of the porous films were not significantly changed after thermal treatment.

TABLE 2

| Porous film | Porosity (%) before thermal treatment | Degree of impregnation (%) before thermal treatment | Porosity (%) after thermal treatment | Degree of impregnation (%) after thermal treatment |
|---|---|---|---|---|
| M-V10E0 | 54.3 | 36.4 | 54.2 | 36.4 |
| M-V9E1  | 57.4 | 44.4 | 56.8 | 44.0 |
| M-V8E2  | 59.1 | 48.2 | 58.9 | 48.7 |
| M-V7E3  | 61.8 | 56.3 | 61.6 | 55.3 |
| M-V6E4  | 64.4 | 61.3 | 64.2 | 61.1 |
| M-V5E5  | 62.9 | 55.2 | 62.4 | 54.1 |

EXAMPLE 3

Preparation of Solvent-Free Polymer Electrolytes

This Example shows an example of a process for preparing a solvent-free polymer electrolyte by impregnating a viscous oligomer into a porous film using porous vacuum filter equipment.

1 g of the P(EO-EC) copolymer with at least one terminal groups substituted by chlorine atom synthesized in Example 1 and 0.23 g of LiCF$_3$SO$_3$ lithium salt (or 0.152 g of LiPF$_6$ lithium salt or 0.16 g of LiClO$_4$ lithium salt) were added to 20 g of acetone and stirred. In the case of using an inorganic filler, 0.015 g of TiO$_2$ powders were further added to 0.985 g of a mixture of the P(EO-EC) copolymer with at least one terminal groups substituted by chlorine atom and the lithium salt. The mixture were dried to remove substantially completely acetone therein to thereby obtain a viscous electrolyte composition. The viscous electrolyte composition with flowability was spread on upper surfaces of the porous films produced in Example 2. At this time, the viscous electrolyte composition was heated at 80° C. to decrease viscosity and thus increase flowability. Then, strong vacuum was applied to lower surfaces of the porous films using a vacuum pump so that the P(EO-EC) and lithium salt-containing oligomer electrolyte composition was infiltrated into pores of the porous films, to thereby obtain solvent-free polymer electrolytes according to the present invention. All these procedures were performed in a dry room or a glove box.

Figure 1B:
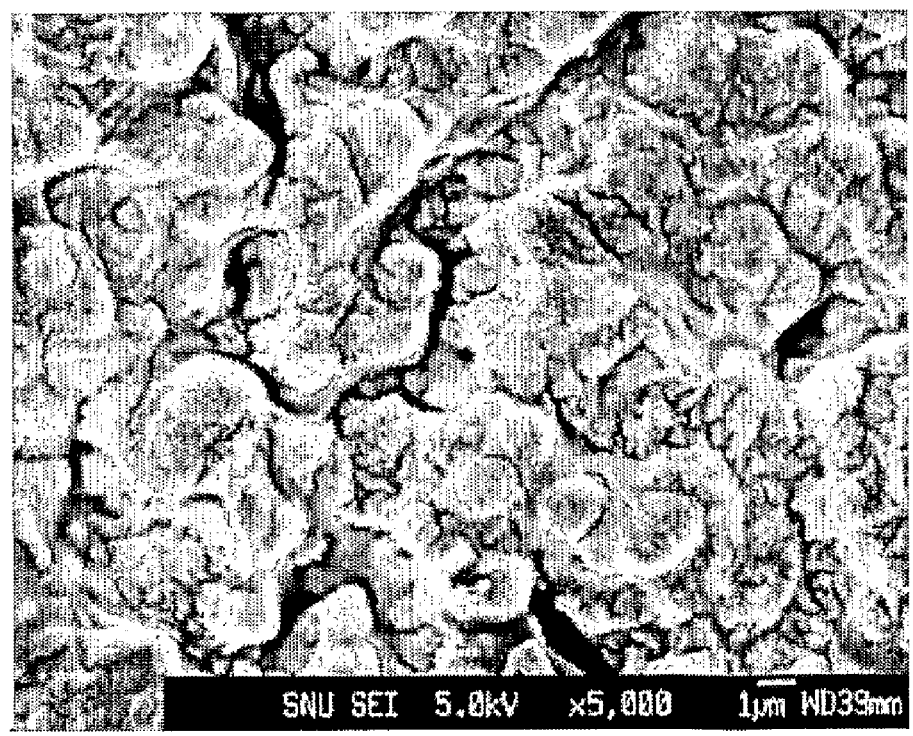
FIG. 1B is a SEM image of a solvent-free polymer electrolyte according to the present invention in which pores of the porous film of FIG. 1A are filled with a viscous oligomer electrolyte composition.

FIG. 1B shows a SEM image of a solvent-free polymer electrolyte according to the present invention thus obtained. Referring to FIG. 1B, the pores observed in FIG. 1A were filled with the viscous electrolyte composition.

Each solvent-free polymer electrolyte thus produced was represented by E-VxEy.

The E-VxEy represents a solvent-free polymer electrolyte obtained by impregnating a corresponding porous film represented by M-VxEy with a mixture comprising a P(EO-EC) oligomer, a lithium salt, and an inorganic filler.

COMPARATIVE EXAMPLE 1

Preparation of Conventional Polymer Electrolyte

A conventional gel-type polymer electrolyte was prepared as follows. That is, a M-V6E4 film of 2 cm×2 cm×180□ in size, fabricated in the same manner as in Example 3, was impregnated with 0.3 g of a mixed organic solvent composed of ethylene carbonate and propylene carbonate (1:1, volume ratio), to thereby obtain a conventional gel polymer electrolyte.

EXPERIMENTAL EXAMPLE 1

Degree of Electrolyte Loss

A solvent-free polymer electrolyte prepared by impregnating a M-V6E4 film of 2 cm×2 cm (180 □ in size, fabricated in the same manner as in Example 3, with 0.4 g of a P(EO-EC) copolymer-LiCF$_3$SO$_3$ electrolyte, and the conventional gel polymer electrolyte prepared in Comparative Example 1 were evaluated for degree of electrolyte loss and the results are presented in Table 3 below.

Degree of electrolyte loss was measured using a thermogravimetric analyzer (TGA) (TGA 2050, TA Instruments). Here, a sample weight was about 10 mg, and the weight of the sample with time was measured by an isothermal process at 40° C. and 70° C. for 12 hours under flowing nitrogen gas atmosphere.

As shown in Table 3, the conventional gel-type polymer electrolyte of Comparative Example 1 underwent a considerable electrolyte loss at both 40° C. and 70° C. after 10 hours, whereas the solvent-free polymer electrolyte according to the present invention did not undergo a weight loss even at 70° C.

TABLE 3

| Sample | Degree of electrolyte loss after 10 hours at 40° C. | | Degree of electrolyte loss after 10 hours at 70° C. | |
|---|---|---|---|---|
| | Total electrolyte (weight loss %) | Electrolyte solution (weight loss %) | Total electrolyte (weight loss %) | Electrolyte solution (weight loss %) |
| Gel polymer electrolyte of Comparative Example 1 | 24 | 55 | 52 | 100 |
| Solvent-free polymer electrolyte of Example 3 | 0 | 0 | 0 | 0 |

EXPERIMENTAL EXAMPLE 2

Mechanical Properties of Porous Films

In this Experimental Example, mechanical properties of the porous films obtained in Example 2 and porous films thermally treated at 110° C. for 2 hours were evaluated.

Figure 2:
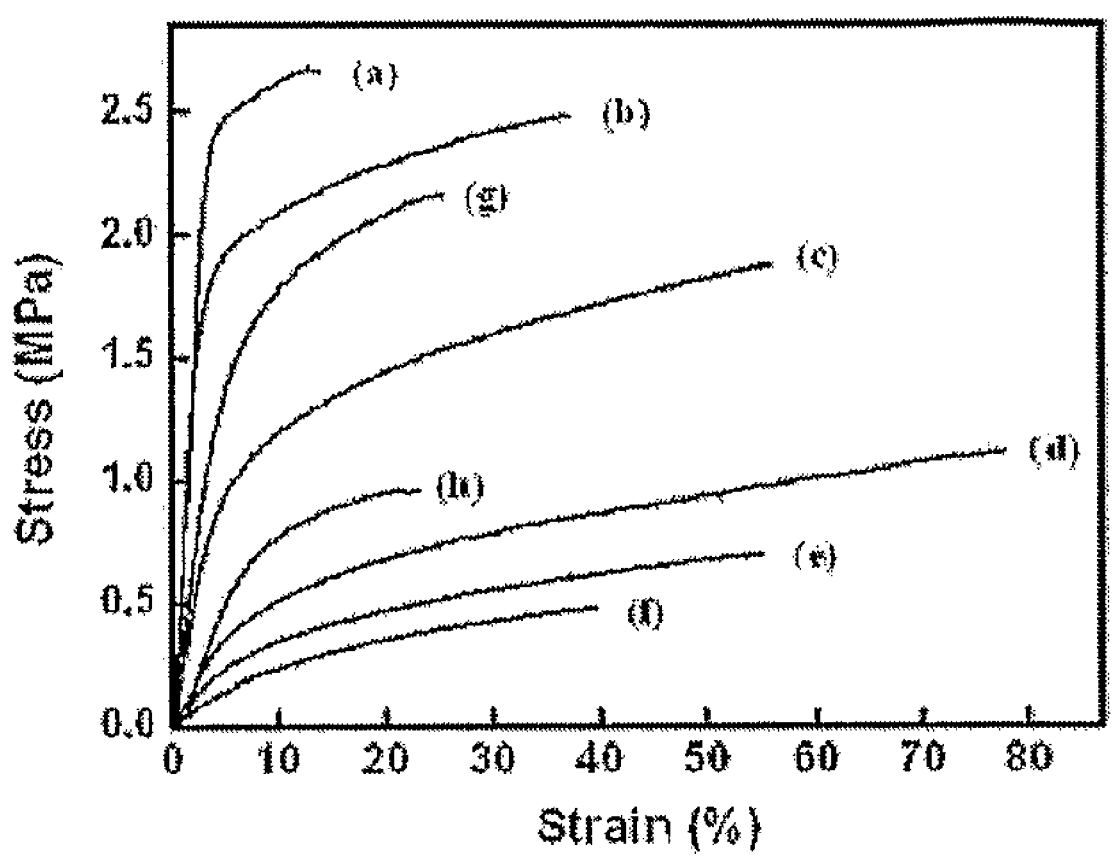
FIG. 2 is a stress-strain curve illustrating the tensile test results of microporous film samples according to the present invention.

The tensile tests for the porous films obtained in Example 2 and the thermally treated porous films were performed according to ASTM D-638-91 as follows. First, dumbbell-shaped samples with a gauge length of 15.5 mm were fabricated. Then, tensile loads were measured while stretching the samples using a universal testing apparatus (UTM) (Model: LR10K, manufactured by Lloyd) equipped with 100 N load cells at a crosshead speed of 20 mm min$^{-1}$. FIG. 2 shows a stress-strain curve obtained in the tensile tests.

In FIG. 2, (a) is a M-V10E0 porous film fabricated using only a P(VdF-HFP) copolymer, (b) is a M-V9E1 porous film in which the weight ratio of P(VdF-HFP) copolymer to P(EO-EC) copolymer is 9 to 1, (c) is a M-V8E2 porous film in which the weight ratio of P(VdF-HFP) copolymer to P(EO-EC) copolymer is 8 to 2, (d) is a M-V7E3 porous film in which the weight ratio of P(VdF-HFP) copolymer to P(EO-EC) copolymer is 7 to 3, (e) is a M-V6E4 porous film in which the weight ratio of P(VdF-HFP) copolymer to P(EO-EC) copolymer is 6 to 4, (f) is a M-V5E5 porous film in which the weight ratio of P(VdF-HFP) copolymer to P(EO-EC) copolymer is 5 to 5, (g) is a thermally treated M-V8E2 porous film, and (h) is a thermally treated M-V6E4 porous film.

Referring to FIG. 2, as the content of a viscous P(EO-EC) copolymer impregnated in a porous film increased, stress gradually decreased, and strain increased from (a) to (d) and then decreased. Meanwhile, in a stress-strain curve for the thermally treated porous films, strain was slightly reduced by thermal treatment but stress increased.

Therefore, it can be seen that appropriate thermal treatment of a porous film in preparation of a solvent-free polymer electrolyte according to the present invention can impart enhanced mechanical property to the solvent-free polymer electrolyte.

EXPERIMENTAL EXAMPLE 3

Electrochemical Properties of Solvent-Free Polymer Electrolytes

In this Experimental Example, the cyclic voltammogram properties and ionic conductivities of the solvent-free polymer electrolytes obtained in Example 3 were evaluated.

Figure 3A:
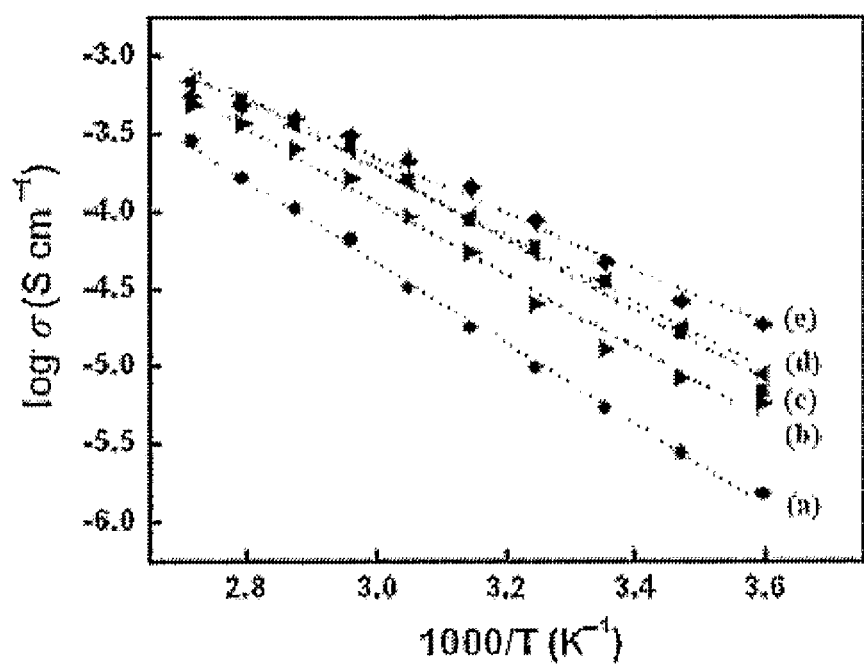
FIG. 3A is a graph illustrating the ionic conductivities of solvent-free polymer electrolytes according to the present invention with respect to the content of an oligomer electrolyte and FIG. 3B is a graph illustrating the ionic conductivities of solvent-free polymer electrolytes according to the present invention with respect to the type of lithium salt.

FIG. 3A is a graph illustrating ionic conductivity measured under vacuum for inactive type battery cells fabricated by interposing the solvent-free polymer electrolytes obtained in Example 3 between two stainless steel electrodes to evaluate a change in ionic conductivity of a solvent-free polymer electrolyte according to the present invention with respect to the content of P(EO-EC) copolymer with at least one terminal groups substituted by chlorine atom.

In detail, impedance values of the battery cells were measured using an impedance measurement apparatus (Zahner Electrik, Model: IM6) at a 10° C. interval at a temperature range from 5 to 95° C. At this time, a measurement frequency was in the range of 0.1 Hz to 1 MHz. To maintain a constant temperature, impedance measurement was performed after the battery cells were left stand in a constant temperature and humidity chamber (KATO, ±0.1° C.) for 6 hours or more. Ionic conductivity (s) of the polymer electrolytes was calculated using the measured impedance values by the following Equation:

$$\text{Ionic conductivity } (S\text{ cm}^{-1}) = L/(R_b \times A)$$

where L is the thickness of a polymer electrolyte, A is the surface area of the polymer electrolyte, and $R_b$ is the resistance of the polymer electrolyte.

In FIG. 3A, (a) is a E-V10E0 electrolyte prepared using the M-V10E0 porous film, (b) is a E-V8E2 electrolyte prepared using the M-V8E2 porous film, (c) is a E-V6E4 electrolyte prepared using the M-V6E4 porous film, (d) is a E-V6E4 electrolyte prepared after thermally treating the M-V6E4 porous film at 110° C. for 2 hours, and (e) is a polymer electrolyte prepared by impregnating the M-V6E4 porous film with an electrolyte containing 1.5 wt % of a TiO$_2$ inorganic filler. These polymer electrolytes were prepared using LiCF$_3$SO$_3$ as lithium salt.

Referring to FIG. 3A, the solvent-free polymer electrolytes according to the present invention exhibited higher ionic conductivity as the porosity and degree of impregnation of the porous films increased. The E-V6E4 electrolyte exhibited optimal ionic conductivity of 3.7×10$^{-5}$ S cm$^{-1}$ at 25° C. The thermally treated E-V6E4 electrolyte exhibited ionic conductivity of 3.5×10$^{-5}$ S cm$^{-1}$ which was almost the same as that before thermal treatment. The E-V6E4 electrolyte with 1.5 wt % of TiO$_2$ exhibited slightly increased ionic conductivity as 3.9×10$^{-5}$ S cm$^{-1}$.

Furthermore, regardless of thermal treatment and presence or absence of an inorganic filler, the solvent-free polymer electrolytes according to the present invention exhibited Arrhenius behavior of ionic conductivity, i.e., no rapid reduction in ionic conductivity even at low temperature. Therefore, it can be seen that thermal treatment of a solvent-free polymer electrolyte according to the present invention enhances mechanical property but induces substantially no decrease in ionic conductivity.

Figure 3B:
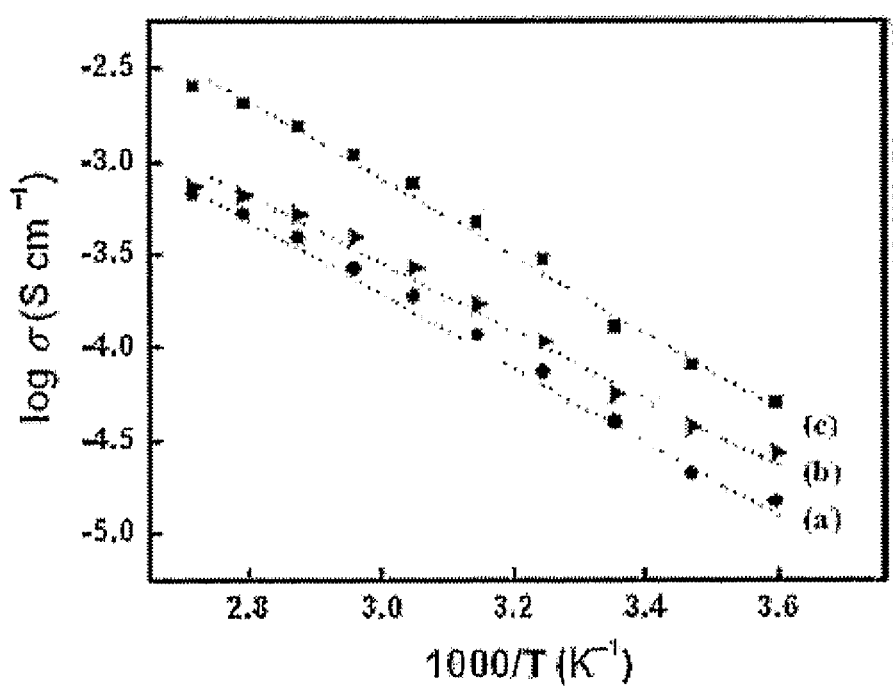

In FIG. 3B, (a) is a E-V6E4 electrolyte prepared by impregnating a M-V6E4 porous film with an electrolyte containing $LiCF_3SO_3$ and 1.5 wt % $TiO_2$, (b) is a E-V6E4 electrolyte prepared by impregnating a M-V6E4 porous film with an electrolyte containing $LiPF_6$ and 1.5 wt % $TiO_2$, and (c) is a E-V6E4 electrolyte prepared by impregnating a M-V6E4 porous film with an electrolyte containing $LiClO_4$ and 1.5 wt % $TiO_2$.

Referring to FIG. 3B, the ionic conductivity of the solvent-free polymer electrolytes according to the present invention was significantly changed according to the type of lithium salt. That is, the polymer electrolyte prepared using 1.5 wt % of a $TiO_2$ inorganic filler and a $LiCF_3SO_3$ lithium salt exhibited ionic conductivity of $3.9 \times 10^{-5}$ S cm$^{-1}$, which was slightly increased compared to that of a polymer electrolyte with no inorganic filler. The polymer electrolyte prepared using a $LiPF_6$ lithium salt with 1.5 wt % of a $TiO_2$ inorganic filler and the polymer electrolyte prepared using a $LiClO_4$ lithium salt with 1.5 wt % of a $TiO_2$ inorganic filler exhibited room temperature ionic conductivity, i.e., $5.0 \times 10^{-5}$ S cm$^{-1}$ and $1.6 \times 10^{-4}$ S cm$^{-1}$, respectively.

Figure 4:
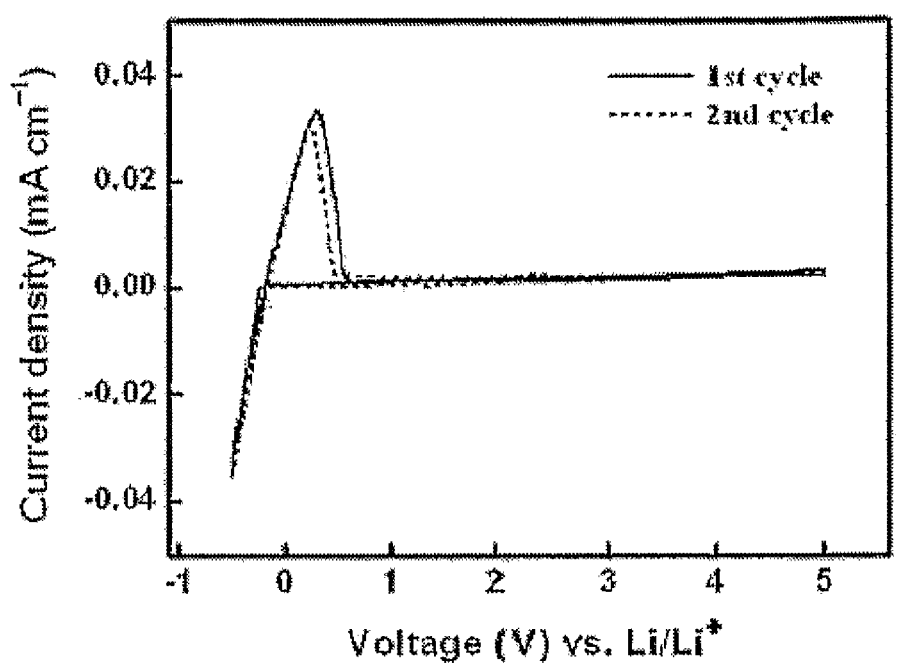
FIG. 4 is a cyclic voltammogram of a solvent-free polymer electrolyte according to the present invention.

FIG. 4 is a cyclic voltammogram for a battery cell obtained by interposing, between a stainless steel electrode used as a working electrode and a lithium electrode used as a reference electrode and a counter electrode, a E-V6E4 polymer electrolyte prepared by impregnating the M-V6E4 porous film obtained in Example 2 with a highly viscous electrolyte containing P(EO-EC) copolymer with at least one terminal groups substituted by chlorine atom and $LiCF_3SO_3$ lithium salt, followed by packaging under vacuum. At this time, voltage was measured at 55° C. within the range of measured potential of −0.5 to 5 V at a rate of 1 mV s$^-$.

Referring to FIG. 4, it can be seen that the E-V6E4 polymer electrolyte is electrochemically stable even at an oxidation potential of at least 5 V for the lithium reference electrode.

EXPERIMENTAL EXAMPLE 4

Molecular Mobility for Lithium Ions of Solvent-Free Polymer Electrolytes

In this Experimental Example, molecular mobility for polymer chains and lithium ions in the solvent-free polymer electrolytes obtained in Example 3 was evaluated using lithium nuclear magnetic resonance spectroscopy ($^7$Li NMR).

Figure 5A:
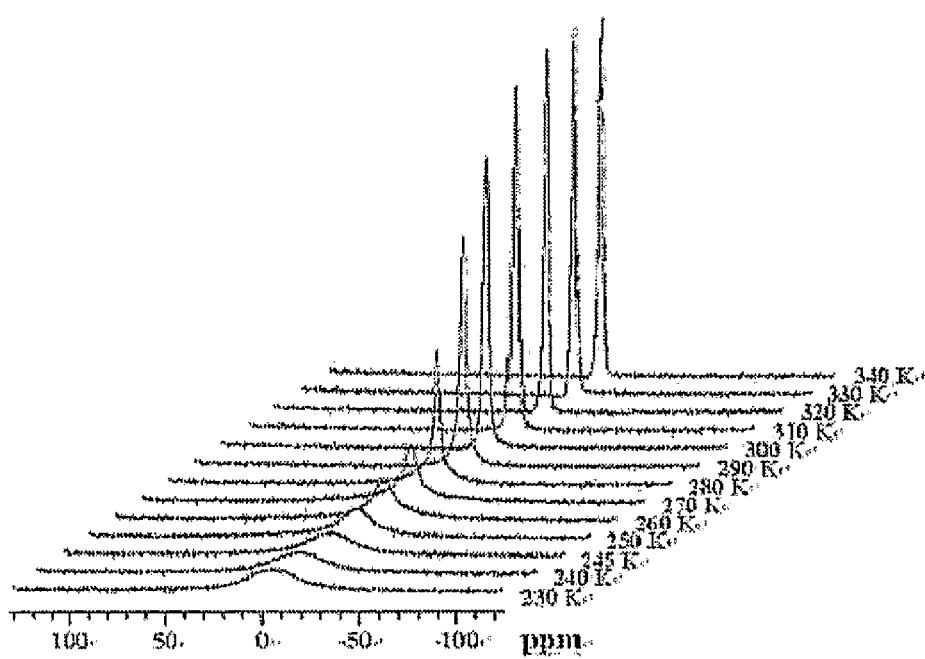
FIGS. 5A and 5B respectively show variation of a linewidth and a full-width at half-maximum of a solvent-free polymer electrolyte according to the present invention as a function of temperature, measured by lithium nuclear magnetic resonance spectroscopy.

FIG. 5A is a graph illustrating a change in linewidth of the E-V6E4 electrolyte obtained in Example 3 with respect to temperature. Referring to FIG. 5A, the molecular mobility of lithium ions was restricted at low temperature, and thus, the linewidth was broadly measured. As temperature increased, the molecular mobility increased, and thus, the linewidth became gradually narrower.

Figure 5B:
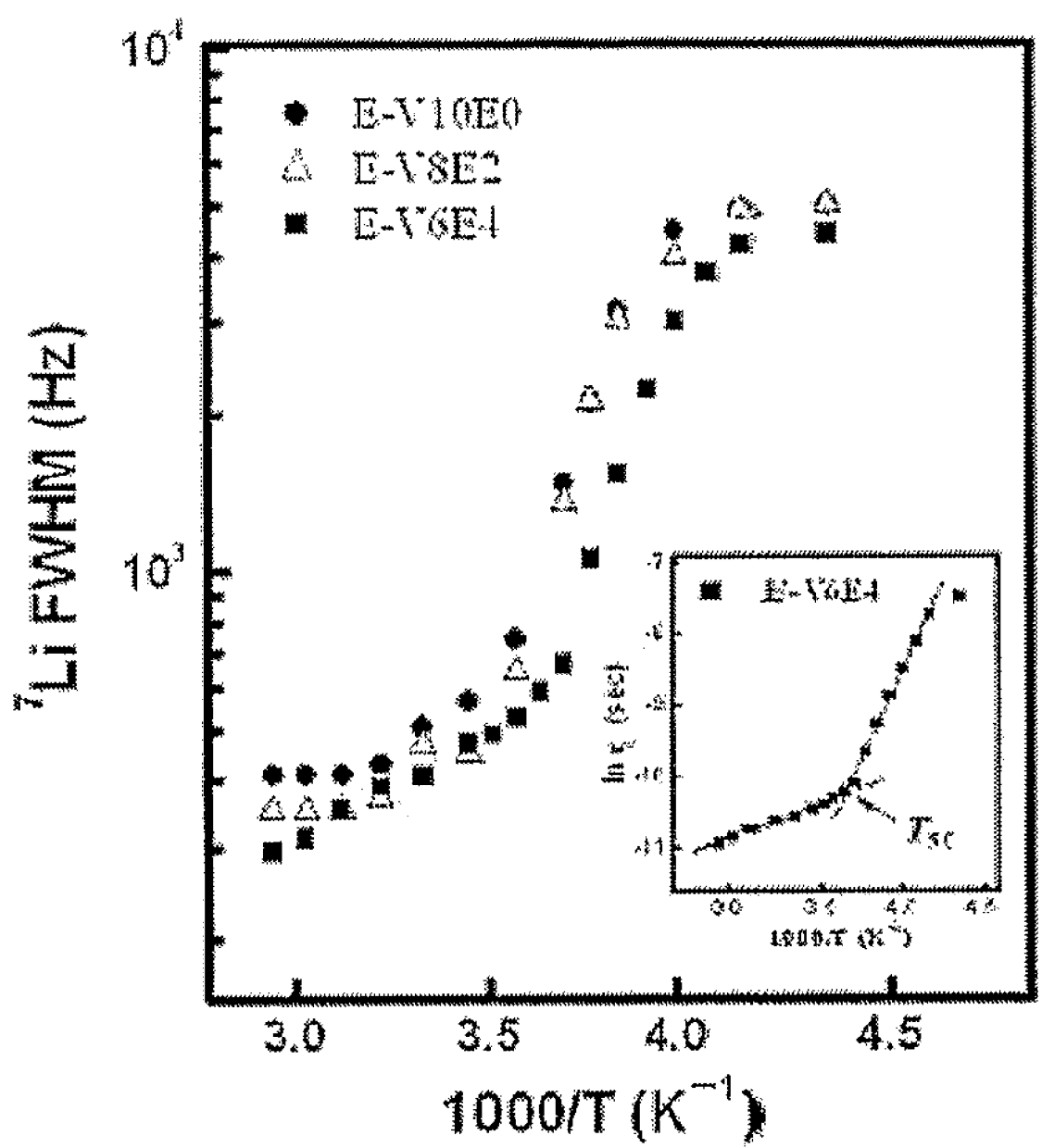

FIG. 5B is a graph illustrating the full-width at half-maximum (FWHM) of the E-V10E0, E-V8E2, and E-V6E4 polymer electrolytes obtained in Example 3 with respect to temperature. The inset of FIG. 5B is a graph illustrating temperature dependence of correlation time ($t_c$) for the FWHM result of the E-V6E4 electrolyte.

Referring to FIG. 5B, as temperature increased, FWHM decreased. In connection with the E-V6E4 electrolyte, a slope of ln $t_c$ value was sharply changed at 1° C. $T_{sc}$ (temperature at slope change) defined as a temperature at which a slope is sharply changed is a very important factor because it shows a change in molecular mobility correlated with ionic conductivity. The results of FIG. 5B were fully consistent with the linear Arrhenius behavior for temperature dependence of ionic conductivity measured at 5° C. or more. Meanwhile, the E-V10E0 electrolyte and the E-V8E2 electrolyte exhibited $T_{sc}$ of 3° C. and 4° C., respectively. This result was also fully consistent with the Arrhenius behavior for temperature dependence of ionic conductivity.

From FIGS. 5A and 5B, it can be seen that molecular mobility with temperature and temperature dependence of ionic conductivity at 5° C. or more for lithium ions exhibit a linear relationship, i.e., Arrhenius behavior.

EXPERIMENTAL EXAMPLE 5

Safety of Unit Batteries Fabricated Using Solvent-Free Polymer Electrolytes

In this Experimental Example, safety characteristics of unit batteries (2 cm in width×2 cm in length) fabricated by interposing the solvent-free polymer electrolytes obtained in Example 3 between cathode plates and anode plates followed by packaging under vacuum were evaluated.

2 g of $LiCoO_2$ as a cathode active material, 1 g of PVDF as a binder resin, and 2 g of carbon black (Super-P) as an electroconductive agent were added to 20 g of N-methyl-2-pyrrolidone and ball-milled for about 5 hours to prepare a cathode active material composition.

The cathode active material composition was coated on aluminum thin films (50 □ in thickness×2 cm in width) using a doctor blade with a 50□ gap, dried, rolled, and cut into predetermined pieces, to thereby produce cathode plates.

Meanwhile, 2 g of carbon powders (MCMB: Osaka Gas Co., average particle size:
about 6□) as an anode active material and 1 g of PVDF as a binder were added to 20 g of N-methyl-2-pyrrolidone and ball-milled for about 5 hours to prepare an anode active material composition.

The anode active material composition was coated on copper thin films (50 □ in thickness×2 cm in width) using a doctor blade with a 50□ gap, dried, rolled, and cut into predetermined pieces, to produce anode plates.

The solvent-free polymer electrolytes with a thickness of 180 □ obtained in Example 3 were interposed between the cathode plates and the anode plates and the resultant structures were vacuum-packaged with aluminum blue bags to complete unit batteries with a thickness of 0.3 to 0.5 mm.

The unit batteries were not ignited or exploded even in cutting with scissors, perforation with a drill, gradual pressing, or repetition of folding and unfolding.

Therefore, it can be seen that a unit battery employing a solvent-free polymer electrolyte according to the present invention exhibits excellent safety.

INDUSTRIAL APPLICABILITY

As apparent from the above description, since a solvent-free polymer electrolyte according to the present invention is prepared by impregnation of a porous film with a viscous oligomer under vacuum, use of an electrolyte solution is not required. Therefore, the solvent-free polymer electrolyte is not accompanied by problems caused by leakage or evaporation of an electrolyte solution. Further, since the viscous oligomer is contained in pores, higher ionic conductivity is accomplished, as compared to a conventional solvent-free polymer electrolyte. In addition, the solvent-free polymer electrolyte according to the present invention does not exhibit rapid reduction in ionic conductivity even at low temperature, and thus, provides high electrochemical stability.

Therefore, use of the solvent-free polymer electrolyte according to the present invention in a secondary battery such as a lithium secondary battery can solve the problems of a conventional secondary battery employing a conventional gel-type polymer electrolyte or solvent-free polymer electrolyte. The solvent-free polymer electrolyte according to the present invention can also be used in a battery requiring high voltage because of its high electrochemical stability, and thus, is expected to be widely used as a polymer electrolyte for a secondary battery.

The invention claimed is:

1. A solvent-free polymer electrolyte comprising: a film having a first surface and a second surface, wherein said film comprises a reticulated network of channels forming pores on the first and second surfaces, and is made of a mixture comprising a first polymer and a second oligomer, the first polymer being at least one selected from the group consisting of poly(vinylidene fluoride-co-hexafluoropropylene) copolymers, polyvinylidenefluorides, polymethylmethacrylates, polyacrylonitriles, polyethyleneoxides, and celluloses having a polyether chain, and the second oligomer being at least one selected from the group consisting of poly(ethylene oxide-co-ethylene carbonate) copolymers with at least one terminal groups substituted by a halogen atom and polyethyleneglycols with at least one terminal groups substituted by a halogen atom; and an electrolyte comprising said second oligomer and a lithium salt, said electrolyte partially , or completely filling the pores formed by said network,
   wherein said each of the first polymer and the second oligomer is present in the mixture in an amount capable of forming a single phase.

2. The solvent-free polymer electrolyte of claim 1, wherein the weight ratio of the first polymer to the second oligomer is in the range of 95:5 to 35:65.

3. The solvent-free polymer electrolyte of claim 1, wherein in the poly(ethylene oxide-co-ethylene carbonate) copolymer, the molar ratio of ethylene oxide unit to ethylene carbonate unit is in the range of 9:1 to 1:9.

4. The solvent-free polymer electrolyte of claim 1, wherein the lithium salt is at least one selected from the group consisting of $LiPF_6$, $LiBF_4$, $LiClO_4$, $LiCF_3SO_3$, $LiC_4F_9SO_3$, $LiN(CF_3SO_2)_2$, $LiAsF_6$, and $LiN(SO_2C_2F_5)_2$.

5. The solvent-free polymer electrolyte of claim 1, wherein the porous film and/or the electrolyte further comprises an inorganic filler.

6. The solvent-free polymer electrolyte of claim 5, wherein the inorganic filler is at least one selected from the group consisting of titanium dioxide ($TiO_2$), silicon dioxide ($SiO_2$), alumina ($Al_2O_3$), gamma-$LiAlO_2$, and zeolite.

7. A secondary battery comprising: an anode comprising a carbonaceous material;
   a cathode comprising a compound enabling intercalation and deintercalation of lithium; and
   a solvent-free polymer electrolyte interposed between the cathode and the anode, wherein the solvent-free polymer electrolyte comprises:
   a film having a first surface and a second surface, wherein said film comprises a reticulated network of channels forming pores on the first and second surfaces, and is made of a mixture comprising a first polymer and a second oligomer, the first polymer being at least one selected from the group consisting of poly(vinylidene fluoride-co-hexafluoropropylene) copolymers, polyvinylidenefluorides, polymethylmethacrylates, polyacrylonitriles, polyethyleneoxides, and celluloses having a polyether chain, and the second oligomer being at least one selected from the group consisting of poly(ethylene oxide-co-ethylene carbonate) copolymers with at least one terminal groups substituted by a halogen atom and polyethyleneglycols with at least one terminal groups substituted by a halogen atom; and an electrolyte comprising said second oligomer and a lithium salt, said electrolyte partially, or completely filling the pores formed by said network,
   wherein said each of the first polymer and the second oligomer is present in the mixture in an amount capable of forming a single phase.

8. The secondary battery of claim 7, wherein the weight ratio of the first polymer to the second oligomer is in the range of 95:5 to 35:65.

9. The secondary battery of claim 7, wherein in the poly(ethylene oxide-co-ethylene carbonate) copolymer, the molar ratio of ethylene oxide unit to ethylene carbonate unit is in the range of 9:1 to 1:9.

10. The secondary battery of claim 7, wherein the lithium salt is at least one selected from the group consisting of $LiPF_6$, $LiBF_4$, $LiClO_4$, $LiCF_3SO_3$, $LiC_4F_9SO_3$, $LiN(CF_3SO_2)_2$, $LiAsF_6$, and $LiN(SO_2C_2F_5)_2$.

11. The secondary battery of claim 7, wherein the porous film and/or the electrolyte further comprises an inorganic filler.

12. The secondary battery of claim 11, wherein the inorganic filter is at least one selected from the group consisting of titanium dioxide ($TiO_2$), silicon dioxide ($SiO_2$), alumina ($Al_2O_3$), gamma-$LiAlO_2$, and zeolite.

13. The secondary battery of claim 7, wherein the compound enabling intercalation and deintercalation of lithium is at least one selected from the group consisting of $LiCoO_2$, $LiMnO_2$, $LiNiO_2$, $LiCrO_2$, and $LiMn_2O_4$.

* * * * *